April 29, 1952 Y. ANGEL 2,594,715

APPARATUS FOR COLOR TELEVISION

Filed Dec. 15, 1948 3 Sheets-Sheet 1

INVENTOR.
Yves Angel

BY Haseltine, Lake & Co.

AGENTS.

April 29, 1952 Y. ANGEL 2,594,715

APPARATUS FOR COLOR TELEVISION

Filed Dec. 15, 1948 3 Sheets-Sheet 2

INVENTOR.
Yves Angel
BY
Haseltine, Lake & Co.
AGENTS.

April 29, 1952 Y. ANGEL 2,594,715

APPARATUS FOR COLOR TELEVISION

Filed Dec. 15, 1948

3 Sheets-Sheet 3

INVENTOR.

Yves Angel

BY

Hazeltine, Lake & Co.

AGENTS.

Patented Apr. 29, 1952

2,594,715

UNITED STATES PATENT OFFICE 2,594,715

APPARATUS FOR COLOR TELEVISION

Yves Angel, Paris, France

Application December 15, 1948, Serial No. 65,417
In France December 27, 1947

5 Claims. (Cl. 178—5.2)

The present invention relates to a system of color television and more particularly to a method of televising, i. e., transmitting and receiving, color images, and to apparatus for carrying out the method according to the invention.

Color television methods are known in which images each corresponding to one of the three fundamental primary colors are transmitted either successively on the same carrier wave, or simultaneously on different carriers, while at the receiver end the colored image is reconstituted by combining these three images.

These known methods have various disadvantages and especially the following:

(a) The method according to which the images are transmitted successively on the same carrier, known as the "sequential method," has the following disadvantages.

(1) Luminosity loss both at the camera end and at the receiving end due to the use of colored filters.

(2) In order to avoid flicker perception, a high field-frequency is necessary and the frequency range necessary to the transmission is proportionally increased.

(3) Colored flashes appear when the eye of the observer quickly scans the transmitted image, and colored fringes appear on rapidly moving objects, both of which result in early fatigue for the observer.

(4) Low efficiency in black-and-white operation.

(b) The method based on simultaneous transmission of the three images corresponding to the three primary colors especially has the following disadvantages:

(1) It is difficult to use for live transmission.

(2) It is necessary to multiplex three television channels on the same carrier with a low cross-modulation rate.

(3) It is difficult to get exact balancing between gains and contrasts of the three channels and to maintain this balance over an appreciable period of time.

(4) It is difficult to get exact superimposition of the three images and to maintain stability thereof.

(5) Low fidelity in black-and-white when using the green channel.

The purpose of the present invention is particularly to overcome these disadvantages.

With this object in view, the invention provides a method of color television in which the image to be transmitted is divided into three primary images. This method is characterized by the juxtaposition of the said primary images in the pick-up device and by scanning these three images in such a way that they are swept as a group over each scanning line.

This method is a characteristic feature of the invention, whatever the apparatus used for carrying it out. It is, however, a further object of the invention to provide apparatus allowing a particularly advantageous and efficient operation of the said method, especially in television equipment for color film transmission, the characteristic feature of this apparatus being that the primary images obtained by sweeping each frame and by splitting the rays of each color by optical means, are first converted into electric signals and then electronically switched in order to deliver a video-frequency signal corresponding to that which would be given by the juxtaposed scanning of the three primary images.

A further object of the invention is to provide a color television equipment for operation according to the above-mentioned or similar method wherein the pick-up camera is provided with an optical device by which the object to be televised is divided into three juxtaposed primary images.

A still further object of the invention is to provide a television receiving set wherein the receiving tube is operated in such a way that the three primary images to be superimposed are reconstituted in juxtaposed relationship in the same arrangement as at the transmitting end.

The invention also includes a film for operation of the above described or similar methods wherein each film-image consists of three juxtaposed recorded primary images. For color television or motion picture purposes, such a film enables the use of a conventional optical system for projecting either onto a television mosaic, or onto a motion-picture screen.

Some examples of the methods and apparatus according to the invention are hereinafter described with reference to the accompanying drawings, in which.

Figure 1:
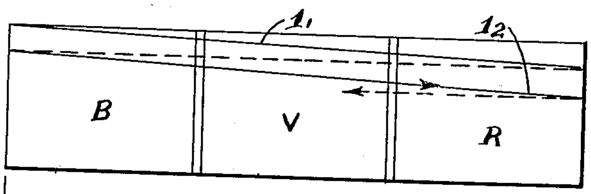
Fig. 1 shows the three primary juxtaposed images which are scanned at the transmitter.

According to the method of the invention, a whole image consists, as indicated on Fig. 1 for example, of the juxtaposed projection of the three blue, green and red primary images. These juxtaposed projected images are scanned in the ordinary way, i. e., the successive scanning lines as $l^1$, $l^2$ . . . going from the left edge of the first primary image B to the right edge of the last primary image R.

The method according to the invention is however in no way restricted to this usual method of scanning.

Figure 2:
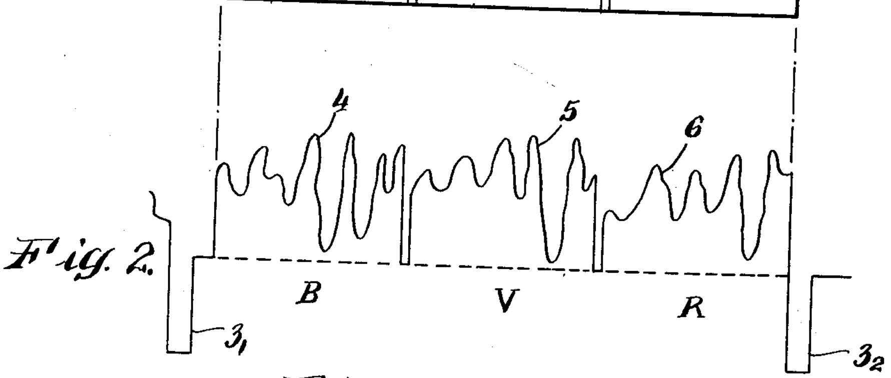
Fig. 2 shows the video-frequency signal given by the scanning of the images of Fig. 1.

The succession of various light points constituting each image is converted in the usual way into a video-frequency signal as represented on Fig. 2.

This video-frequency signal includes the pulse-signal $3^1$ for line synchronization, the signal 4 corresponding to scanning of the first image B, the signal 5 corresponding to the second image V, and the signal 6 corresponding to the third image R. The signal 6 is followed by the next synchronization-pulse $3^2$. In this way, the three primary images are scanned by each scanning line.

Ordinary standards concerning the number of lines, frame-frequency, aspect ratio and interlacing may be used.

A color sequential analysis is thus obtained with a high color field-frequency which avoids flicker and colored flash effects.

On the other hand, difficulties arising from multiplexing three television channels on the same carrier wave and exactly balancing gains and contrasts of the amplifier chain are avoided.

The video-frequency band width is obviously three times wider than in black-and-white operation for the same resolution and standard.

Figure 3:
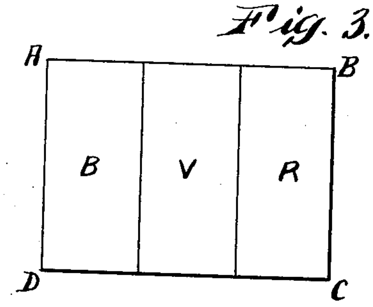
Fig. 3 shows diagrammatically the three images of Fig. 1 modified in order to obtain them in a normal aspect ratio.

In order to use the aspect ratios that are in general use in television networks, each image B, V, R, may be anamorphosed in such a way that the whole image has the usual aspect ratio (Fig. 3). This anamorphosis may easily be obtained with the aid of a suitable optical device. It is also possible to modify the dimensions of the different primary B, V, R images of Fig. 3 in order to obtain B, V, R, images having different widths. An economy of video bandwidth may be obtained if the width of each primary image is proportioned to the resolving power of the eye, for the corresponding color.

The method of the invention offers many advantages among which are the following:

(1) Flicker effect is avoided.

(2) Colored flashes are avoided when the observer's eye quickly scans the image, and colored fringes on rapidly moving objects are also avoided.

(3) A single carrier wave is used for transmission, with a bandwidth which may be reduced to a value smaller than that necessary in known sequential television systems.

(4) It is possible to balance gains and contrasts of the three images with great accuracy.

(5) There is no luminosity-loss relatively to black-and-white pick-up, the same light flux in both cases being projected through the same lens onto the same rectangular area A, B, C, D (Figs. 3 and 4) provided that the whole light flux getting through the lenses be effectively used i. e., projected onto the rectangle A, B, C, D.

(6) The three images may be projected close together, as there is no discontinuity on the photo-sensitive electrode of the pick-up tube, no parasite signal being thus produced and no blanking between two adjacent primary images of the same whole image being necessary.

(7) At the receiver, the following advantages are also obtained in comparison with previously known methods.

(*a*) The corresponding points of the three images necessarily coincide and the accuracy of superimposition becomes independent of vertical geometrical distortions which might take place in the transmitting equipment or in the receiver.

(*b*) There is no variation of framing of the image, the consequence of which is an increased stability of superimposition in time.

The reconstitution of images at the receiving end may be effected either sequentially or simultaneously.

Sequential reproduction may be obtained in the following manner: The screen of the cathode-ray receiving tube is scanned in the usual way but with a line-deflection frequency three times that at the transmitting end. Thus the three images are in exact super-imposition subject to the sole condition that the scanning in the transmitting camera is perfectly linear. A color filter inserted on the path of the light changes colors at a frequency equal to the line-frequency.

Simultaneous reproduction may be obtained in either of the two following manners:

(*a*) The screen of the cathode ray tube is scanned according to Fig. 1, i. e., the scanning method is the same at both terminals of transmission. The three images are reconstituted in juxtaposed relationship on the cathode ray tube screen as on the pick-up tube. Each primary image covers one-third of the whole surface as indicated on Fig. 3. Each area corresponding to a primary image is provided with a color filter corresponding in color to the image projected on that area, i. e., respectively blue, red and green filters.

An optical device gives the observer three apparently super-imposed images and anti-anamorphosing them if necessary.

Instead of providing color filters, a special cathode ray tube may be used, the screen of which is divided into three adjacent areas each coated with a different fluorescent substance according to the appropriate color of the corresponding primary image.

The use of such a cathode-ray tube provides an increased illuminating efficiency, since the whole light flux emitted by the fluorescent screen and passing through the optical device is put to use, whereas a part of this flux would be lost if filters were used.

(*b*) According to another simultaneous method, three cathode ray tubes are used in the receiver, the control electrode of the three cathode ray tubes and the corresponding deflection coils being fed from a common input. The saw-tooth shaped current for line scanning has a peak to peak amplitude, one-third of which is sufficient to produce the total deflection on the cathode ray tube screen.

The framing of each individual cathode ray tube is so adjusted that only the desired primary image appears on the central part of that screen (Fig. 5), the vertical deflections of the three tubes being adjusted in accordance with each other.

The colored picture is reconstituted by optical superimposition of the images obtained on each tube by the above described method.

The method according to the invention, which is primarily intended for direct transmission and reception of live scenes, may also be used for film or slide transmission and reception.

For example, in televising motion-picture film a standard colored film may be used and the primary images may be separated in the usual way by color filters and juxtaposed projection of them on the photo-sensitive electrode of the pick-up tube.

The film may be analysed for example by a storage scanning device or by any other known method such as a high-speed viewer or a continuous motion projector.

Figure 7:
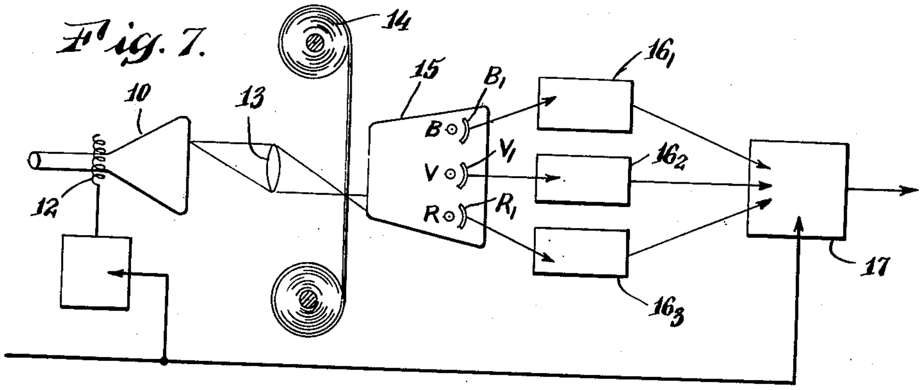
Fig. 7 shows diagrammatically a first embodiment of a television apparatus for motion picture film transmission.

In accordance with the device shown in Fig. 7, the motion-picture film may also be scanned by the flying spot of a cathode-ray tube 10, which scans the whole screen under the control of a deflecting device 11 exciting the deflection coils 12.

The deflection saw-tooth line-frequency current is three times the line frequency of the television system under consideration. The light coming from the flying spot is focused by an optical device 13 onto the film 14. After passing through the film, the light beam is directed into a beam splitter 15, in which the three B, V, R colors are separated. In the beam-splitter, each of the three photo-electric cells $B^1$, $V^1$, $R^1$, is excited by the rays of the corresponding color, and the signal arising from each cell is supplied to an associated preamplifier $16^1$ for the cell $B^1$, $16^2$ for the cell $V^1$, $16^3$ for the cell $R^1$.

The output voltage of each preamplifier is applied to an electronic switch 17 synchronized with the scanning device 11. At the output of the electronic switch 17, the video-frequency signal can be used to modulate a radio-frequency transmitter after passing through various amplifiers of usual type.

Figure 8:
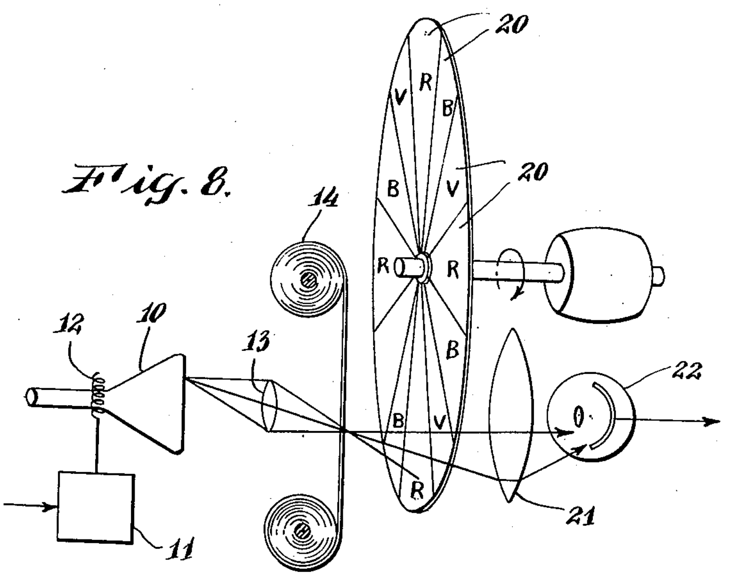
Fig. 8 shows a second embodiment for obtaining the same result as in the case of Fig. 7.

According to another embodiment (Fig. 8), the scanning light beam issuing from the optical device 13, after passing through the film 14, passes through a rotary filter 20 having successive sectors $20_B$, $20_V$, $20_R$, each corresponding to one of the primary colors.

At the output of this filter, the light beam corresponding successively to each primary color, is focused by an optical system 21 on a photo-electric cell 22, which delivers at its output the video-frequency signal to be amplified for modulating the radio transmitter.

Figure 5:
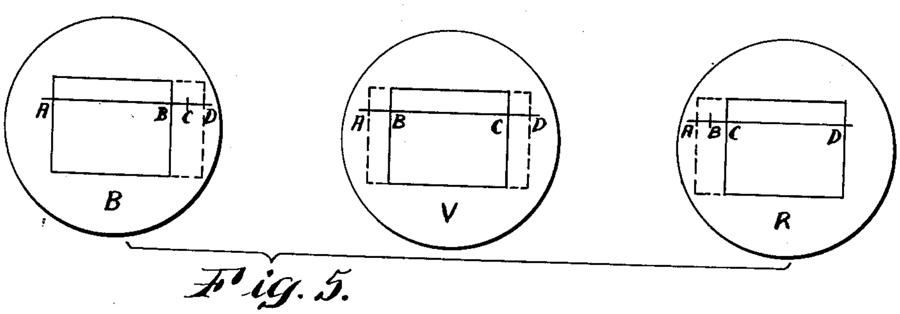
Fig. 5 shows various primary images in their actual position, for example, on the screen of a receiver-set.
Figure 6:
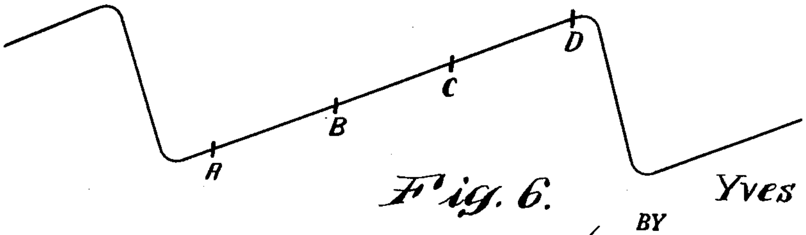
Fig. 6 shows the scanning-signal.

Three cathode-ray tubes may also be used for scanning the film, the spectral distributions of which correspond to the primary colors, the scanning being effected according to Figs. 5 and 6. A photo-electric cell provided with an optical system gives the video-frequency signal.

The invention which may generally be applied to all these television methods and apparatus, also includes a motion picture film allowing direct transmission of pictures. Each frame of motion picture film 23 (Fig. 9) is divided into three B, V, R, elementary frames, each corresponding to a primary image of the object to be televised. For pick-up the light passes through the moving picture film and through a trichromatic filter to be projected into the photosensitive tube and the video-frequency signal is generated in the usual way.

The video-frequency signal may also be produced from three separate moving-picture films each constituted by the sequence of elementary positive or negative frames corresponding to each primary color. This fact allows the invention to be applied to a process for testing negative color motion picture, whether they be on a single strip or on three strips.

Figure 9:
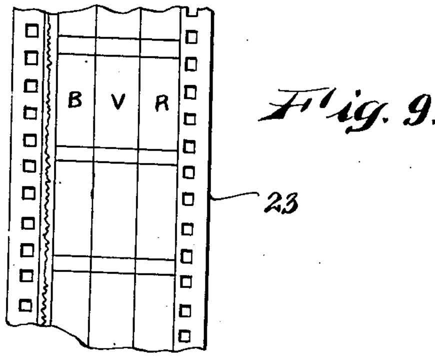
Fig. 9 shows a type of film particularly suitable for transmission according to the method of the invention.

The motion picture film shown in Fig. 9 may be used in the operation of usual motion-picture projectors subject only to employing an optical system for superimposition of the images on the screen and antianamorphosing them, instead of the usual lenses. Moreover, color filters must then be used in the projector on the path of the light beam.

Figure 10:
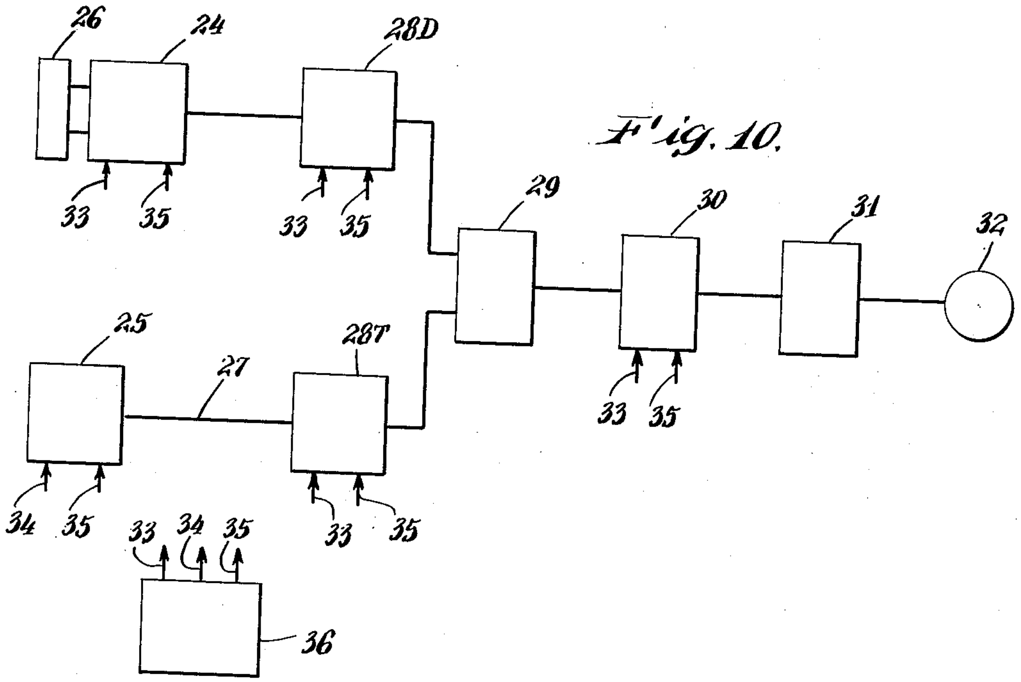
Fig. 10 shows in diagram a color television transmitting station operating according to the described method.

Fig. 10 shows by way of example, the block-diagram of a color television transmitting-station provided with a direct pick-up camera 24 and a moving picture transmission projector 25. The direct pick-up camera 24 is not substantially different from those which are used in black-and-white operation with the same number of lines, but the video band-width of the amplifier chain is increased, and a special optical system 26 gives three primary juxtaposed images, as indicated above.

The motion-picture transmission may be obtained as indicated above, and especially by the method according to which the primary images given by scanning each moving picture frame, and by an optical separation of them are switched by electronic means, in order to get a video-frequency signal corresponding to that given by juxtaposed scanning of three primary images. The terminal 27 then represents the single output of the electronic switch 17.

The signals coming from the camera 24, or from the moving picture film scanner 25, are amplified and corrected as is the general practice in the amplifier equipments 28D and 28T. The signals are then mixed or switched in the mixer 29, and the synchronization-pulses are added in the synchronization mixer 30, from the output of which they are fed into the transmitter 31 and the antenna 32. The synchronization generator 36 comprises different output circuits:

An output 33 giving the line-frequency sweeping signal,

An output 34 giving a signal at three times the line frequency sweeping signal,

An output 35 for the field frequency sweeping signal.

The outputs 33 at the line-frequency and 35 at the frame-frequency supply the amplifier chain 28D of the direct pick-up camera, the said camera itself, the amplifier chain 28T of the motion picture film scanner 25 and the synchronization mixer 30.

The output 34 at a frequency which is three times the line-frequency and the output 35 at the field-frequency supplying the motion-picture film scanner 25.

Figure 11:
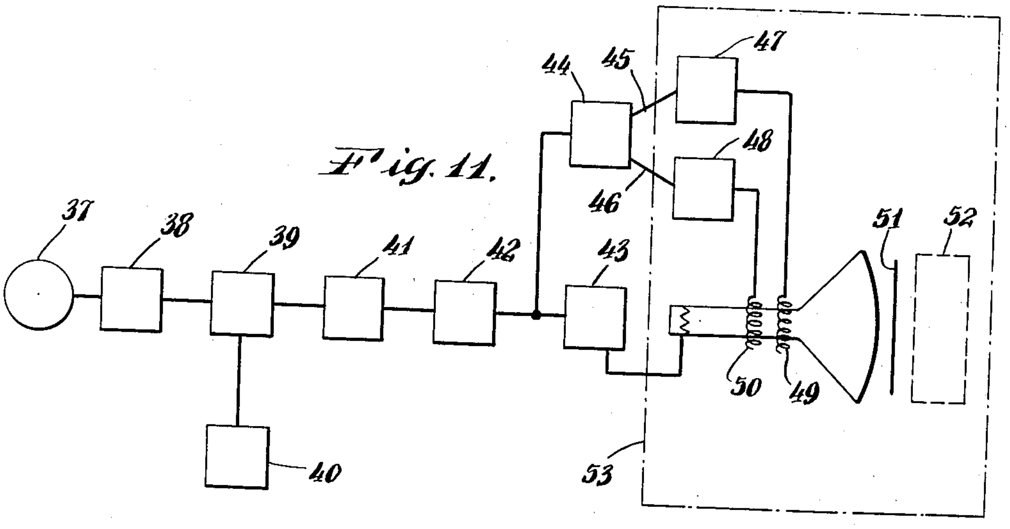
Fig. 11 shows in diagram a color television receiver operating according to same method.

Figure 11 shows the whole diagram of a color television receiver. A superheterodyne receiver has been chosen although this special characteristic, having no relation to the invention, does not introduce any limitation whatsoever.

The radio-frequency signal, collected by the antenna 37 from the electromagnetic wave, is amplified in the radio-frequency stages 38, and then converted into an intermediate-frequency signal by the first detector 39, supplied by the local oscillator 40. The signal, after passing through the intermediate frequency amplifier 41, is detected in 42. The detected video-frequency signal is further amplified in a video-frequency amplifier 43, the output of which acts on the cathode-ray tube modulation electrode.

In the video-frequency output 42 of the detector, the various signals are separated in circuits 43 and 44, including an output 45 for line-pulses and an output 46 for image-pulses. These pulses are changed into scanning signals and amplified in the amplifiers 47 and 48 which supply the deflection coils 49 and 50.

Figure 4:
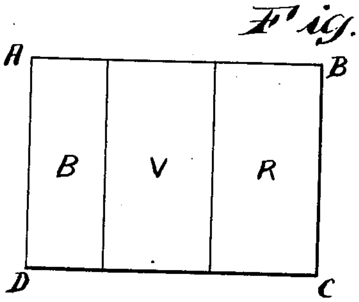
Fig. 4 shows diagrammatically the three juxtaposed projected images reduced to a standard aspect ratio, the various primary images having different dimensions.

From these elements a threefold image constituted as indicated in Figs. 3 and 4 may be obtained on the cathode-ray tube.

In order to reconstitute the color image, a filter 51 with three differently colored areas is set up in front of the screen of a cathode-ray tube having a white fluorescence, the convenient primary color for each of the three images being obtained from the corresponding filter. The superimposition of the three primary images is then obtained by an optical device 52 giving the whole image which is intended either for direct observation or for projection onto a screen.

The filter 51 may be limited to a corrector filter, unless altogether eliminated in the case where a cathode-ray tube with a three-fold screen is used as indicated above.

The receiver-set can be built according to the other above described methods, for example by using three cathode-ray tubes. It is then convenient to change the units in the frame 53 of Fig. 11 for those corresponding to the other methods of operation.

The invention described in accordance with the foregoing illustrative embodiments is not limited to the examples referred to but includes all modifications and variations falling within the spirit or scope of the appended claims.

What is claimed is:

1. In a system for color television, a transmitter comprising optical means for obtaining a rectangular undistorted image of a given aspect ratio of the object to be televised, further optical means for deriving from said rectangular images three monochromatic rectangular images each of which is of one different primary color, optical means for anamorphosing each of said three monochromatic images so as to alter their individual aspect ratio by reducing the ratio of the length of their longer side to that of their shorter side, means for projecting all three said anamorphosed images side by side onto a photoelectrically sensitive surface in such an arrangement that said three anamorphosed images are juxtaposed along one of their sides parallel to the direction of their shorter side prior to their anamorphosing, means for scanning said surface at a given line frequency in a direction substantially perpendicular to the direction of the juxtaposed sides of said juxtaposed, anamorphosed and projected images and in such a manner that each line successively scans each one of said projected images, means for converting luminosity variations encountered in scanning said projected images into electric signals, and means for transmitting said electric signals into a communication channel.

2. A color television transmitter as in claim 1 wherein the aspect ratio of the assembly of the three anamorphosed and projected monochromatic images is substantially the same as that of the rectangular undistorted image of the object to be televised.

3. A color television transmitter as in claim 1, wherein a different anamorphosis ratio is used for each monochromatic image, the various anamorphosis ratios being chosen in such a manner that the area of each monochromatic anamorphosed image is proportioned to the resolving power of the eye for the corresponding color.

4. In apparatus for televising color motion-picture, a transmitter comprising a motion-picture film each frame of which comprises a threefold image made of three juxtaposed elementary black and white images, each of said elementary images being the photograph of the object made through a color filter selecting rays of a different primary color, each of said elementary images being anamorphosed in such a way that the whole frame has the standard dimensions used in black and white motion-picture, a source of light illuminating said film, means for projecting said three-fold image on a photoelectrically sensitive surface, means for scanning said whole threefold projecting image on said surface at a given line-frequency and in such a manner that each line successively goes through each one of monochromatic images, means for converting luminosity variations of said whole threefold image into electric signals, and means for transmitting said electric signals into a communication channel.

5. In apparatus for televising color motion-picture as in claim 4, a transmitter wherein the three elementary black and white images composing each frame of the film are of unequal areas, the area of each elementary image being proportioned to the resolving power of the eye for the corresponding color.

YVES ANGEL.

REFERENCES CITED

The following references are of record in the file of this patent:

UNITED STATES PATENTS

| Number | Name | Date |
|---|---|---|
| 2,055,557 | Replogle | Sept. 29, 1936 |
| 2,200,285 | Lorenzen | May 14, 1940 |
| 2,275,898 | Goldsmith | Mar. 10, 1942 |
| 2,319,789 | Chambers | May 25, 1943 |
| 2,350,892 | Hewson | June 6, 1944 |
| 2,378,746 | Beers | June 19, 1945 |
| 2,389,646 | Sleeper | Nov. 27, 1945 |

FOREIGN PATENTS

| Number | Country | Date |
|---|---|---|
| 64,937 | Denmark | Oct. 28, 1946 |
| 231,805 | Switzerland | Feb. 9, 1942 |
| 562,334 | Great Britain | Oct. 8, 1942 |
| 860,541 | France | Sept. 12, 1939 |